US008462710B2

(12) United States Patent
Walker et al.

(10) Patent No.: US 8,462,710 B2
(45) Date of Patent: Jun. 11, 2013

(54) MECHANISM TO UNIQUELY IDENTIFY AND UNIFY A USER'S SET OF PACKET BEARER CONTEXTS IN A MOBILE TELECOMMUNICATIONS NETWORK

(75) Inventors: John Michael Walker, Den Haag (NL); Anders Åhlén, Göteborg (SE); Göran Hall, Mölndal (SE); Gunnar Mildh, Sollentuna (SE); Mattias Wahlqvist, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 197 days.

(21) Appl. No.: 12/522,565

(22) PCT Filed: Nov. 9, 2007
(Under 37 CFR 1.47)

(86) PCT No.: PCT/IB2007/003429
§ 371 (c)(1),
(2), (4) Date: Jan. 19, 2011

(87) PCT Pub. No.: WO2008/084287
PCT Pub. Date: Jul. 17, 2008

(65) Prior Publication Data
US 2011/0158181 A1 Jun. 30, 2011

Related U.S. Application Data

(60) Provisional application No. 60/884,091, filed on Jan. 9, 2007.

(51) Int. Cl.
*H04W 4/00* (2009.01)
*H04W 72/00* (2009.01)
*H04J 3/24* (2006.01)
*H04M 1/66* (2006.01)
*H04M 1/68* (2006.01)
*H04M 3/16* (2006.01)

(52) U.S. Cl.
USPC ............ 370/329; 370/349; 455/411; 455/450

(58) Field of Classification Search
USPC .......................... 370/329, 349; 455/411, 450
See application file for complete search history.

(56) References Cited

U.S. PATENT DOCUMENTS

2005/0120350 A1\* 6/2005 Ni et al. ..................... 718/105
2008/0051084 A1\* 2/2008 Casati et al. ............ 455/435.1

(Continued)

FOREIGN PATENT DOCUMENTS

WO    WO 2006/114628 A    11/2006

OTHER PUBLICATIONS

Universal Mobile Telecommunications System (UMTS); Feasibility study for transport and control separation in the PS CN domain (3GPP TR 23.873 version 4.0.0 Release 4); Mar. 2001; pp. 31, and 71-77.\*

(Continued)

*Primary Examiner* — Alpus H Hsu
*Assistant Examiner* — Yee Lam

(57) ABSTRACT

A traffic plane entity (e.g., user plane entity (UPE), serving gateway (S-GW)) and method are described herein for allocating a unique identifier (e.g., UPE/S-GW UE-Context-Id) which identifies and unifies a set of bearers within a UE context that is associated with a given UE. In operation, the traffic plane entity can then send the allocated unique identifier to another entity (e.g., mobility management entity (MME)) which at a subsequent time re-sends the unique identifier back to the traffic plane entity along with a request to have the traffic plane entity perform a specific operation or procedure on the bearers associated with the UE context of the given UE. Upon receiving the request, the traffic plane entity uses the unique identifier to perform the requested operation or procedure simultaneously on all of the bearers associated with the UE context of the given UE.

21 Claims, 4 Drawing Sheets

U.S. PATENT DOCUMENTS

2008/0256220 A1* 10/2008 Bachmann et al. ............ 709/222
2009/0067628 A1* 3/2009 Pudney et al. ................. 380/247
2010/0246533 A1* 9/2010 Lundin et al. ................. 370/332

OTHER PUBLICATIONS

Universal Mobile Telecommunications System (UMTS); Feasibility study for transport and control separation in the PS CN domain (3GPP TR 23.873 version 4.0.0 Release 4; Mar. 2001; pp. 31, and 71-77.*

Universal Mobile Telecommunications System (UMTS); Feasibility study for transport and control separation in the PS CN domain (3GPP TR 23.873 version 4.4.4 release 4) ETSI TR 123 873 vol. 3-SA2, No. V400 Mar. 2001 XP014015710.

Nortel, :GPRS One Tunnel with no 3G Bearer on SGSN: Feb. 13, 2006; XP002439181.

* cited by examiner

MECHANISM TO UNIQUELY IDENTIFY AND UNIFY A USER'S SET OF PACKET BEARER CONTEXTS IN A MOBILE TELECOMMUNICATIONS NETWORK

CLAIM BENEFIT OF PRIOR FILED U.S. APPLICATION

This application claims the benefit of U.S. Provisional Patent Application Ser. No. 60/884,091 which was filed on Jan. 9, 2007 the contents of which are hereby incorporated by reference herein.

TECHNICAL FIELD

The present invention relates to the telecommunications field and, in particular, to a traffic plane entity (e.g., user plane entity (UPE), serving gateway (S-GW)) and method that allocate a unique identifier (e.g., UPE/S-GW UE-Context-Id) which identifies and unifies all of the bearers within a UE context that is associated with a given UE.

BACKGROUND

The following terms and abbreviations are herewith defined, at least some of which are referred to within the following description of the prior art and the present invention.
BSS Base Station System
CDR Call Detail Record
CGF Charging Gateway Functionality
E-UTRAN Evolved UMTS Terrestrial Radio Access Network
FFS For Further Study
GERAN GSM EDGE Radio Access Network
GGSN Gateway GPRS Support Node
GPRS General Packet Radio Service
GSM Global System for Mobile Communication
HSS Home Subscriber Server
HLR Home Location Register
IASA Inter Access System Anchor
IMSI International Mobile Subscriber Identity
IP Internet Protocol
LI Lawful Interception
LTE Long Term Evolution
MSC Mobile Switching Center
MME Mobility Management Entity
PCEF Policy and Charging Enforcement Function
PCRF Policy and Charging Rules Function
PDN Packet Data Network
PDP Packet Data Protocol
PLMN Public Land Mobile Network
QoS Quality of Service
SAE System Architecture Evolution
SGSN Serving GPRS Support Node
S-GW Serving Gateway
SM-SC Short Message-Service Centre
SMS Short Message Service
TA Tracking Area
TEID Tunnel End Point Identifier
UE User Equipment
UMTS Universal Mobile Telecommunications System
UPE User Plane Entity
UTRAN UMTS Terrestrial Radio Access Network
VLR Visitor Location Register
WLAN Wireless Local-Area Network MME: The MME manages and stores the UE contexts which contain UE/user identities, UE mobility state, user security parameters. The MME generates temporary identities and allocates them to UEs. The MME checks the authorization whether the UE may camp on the TA or on the PLMN. The MME also authenticates the user.

S-GW: The S-GW terminates for idle state UEs the downlink data path and triggers paging when downlink data arrives for the UEs. The S-GW manages and stores UE contexts, e.g. parameters of the IP bearer service or network internal routing information. The S-GW also performs replication of the user traffic in case of interception.

UE Context: The UE Context stores all the information related to a specific UE. The UE context is created when a node becomes aware of the corresponding UE (for example at attach) and is removed when the UE disappears from the node due to some other network event (for example the UE is switched off, or is handed over to another node). The term UE context is a general term where the actual information contained within the UE context might differ, depending on which node one is referring to, for instance, the MME might store authentication keys, cell identify, allowed tracking areas in its UE contexts, while the UPE (or S-GW) might store packet filters and tunnel endpoints in its UE contexts.

UPE: The UPE terminates for idle state UEs the downlink data path and triggers paging when downlink data arrives for the UEs. The UPE manages and stores UE contexts, e.g. parameters of the IP bearer service or network internal routing information. The UPE also performs replication of the user traffic in case of interception (note: the UPE and S-GW may be the same node).

Referring to FIG. 1 (PRIOR ART), there is shown a diagram of an exemplary mobile packet telecommunications network 100 which has an architecture in accordance with the standard 3GPP TR 23.882 v.1.11.1. This particular mobile packet telecommunications network 100 which has an evolved packet core is described in detail within the 3GPP TR 23.882 v.1.11.1 entitled "3GPP System Architecture Evolution: Report on Technical Options and Conclusions (Release 7)", dated June 2007 (the contents of which are incorporated by reference herein). As such, those skilled in the art are familiar with the architecture and functionality of this particular mobile packet telecommunications network 100. Thus, for clarity only the UPE 102 and the MME 104 which happen to be relevant to the present discussion are going to be discussed in detail herein while the other well known components or entities like the E-UTRAN, SGSN, HSS, PCRF, GERAN, Charging System, SAE Anchor, PDN Gateway, UTRAN etc. . . . are not discussed in detail within this document. In this example, the UPE 102 is shown in the same box as the MME 104. However, even though the UPE 102 and MME 104 appear together in this architectural diagram, this is not necessarily a requirement and if desired the UPE 102 could be separated from the MME 104 when they are actually deployed.

The UPE 102 functions to handle a user plane which is related to packet bearer communications while the MME 104 functions to handle a control plane that is related to the packet bearer communications (see the aforementioned definitions of the UPE 102 and the MME 104). In particular, the UPE 102 by being part of an evolved packet core pursuant to the standard 3GPP TR 23.882 v.1.11.1 provides the following functions (for example):

1. Packet routing and forwarding: For intra-UPE handovers without an MME 104 change.

2. Depending on solution: Allocation of a local IP address from the UPE address space where the local IP address is used by mobility mechanisms.

3. FFS: The Policy and Charging Enforcement Function (PCEF) which is based on TS 23.203 for scenarios involving roaming.

4. Depending on solution: Policy and Charging Enforcement Function (PCEF) based on TS 23.203 for route optimization scenarios.

5. Depending on solution: Collection of charging information for online or offline charging systems where the charging information is related to roaming with home routed traffic. In particular, the UPE 102 may generate CDRs and may deliver the CDRs without passing them through the MME 104.

6. Depending on solution: Collection of charging information when route optimization is applied. In particular, the UPE 102 may generate CDRs and may deliver CDRs without passing them through the MME 104.

7. Depending on solution: Lawful interception of user plane traffic. In particular, the UPE 102 delivers the lawful interception data to the appropriate personnel without passing it through the MME 104. The UPE's 102 control of the lawful interception is independent of the MME 104.

8. Intra E-UTRAN Mobility Anchor for the user plane.

9. Depending on solution: The inter-3GPP access system Mobility Anchor.

10. Triggers and/or initiates a paging when downlink data arrives for a UE while that UE is in the LTE IDLE state.

11. FFS : Routing path establishment and changes with the IASA.

The problem associated with the current UPE 102 will be discussed in detail below after a brief discussion is provided about a newer version of the mobile packet telecommunication network 100 and in particular the evolved packet core which has subsequently been standardized in 3GPP TS 23.401 v1.0.0 entitled "GPRS Enhancements for E-UTRAN Access (Release 8)" dated May 2007 (the contents of this document are incorporated by reference herein). FIGS. 2A and 2B (PRIOR ART) are provided to illustrate the architecture of two exemplary mobile packet telecommunications networks 200a and 200b which have a newer version of an evolved packet core in accordance with 3GPP TS 23.401 v1.0.0.

The people skilled in the art are familiar with the architecture and functionality of these two exemplary mobile packet telecommunications networks 200a and 200b. Thus, for clarity only the S-GW 202 (corresponding with the UPE 102) and the MME 204 (corresponding with the MME 104) which happen to be relevant to the present discussion are going to be discussed in detail herein while the other well known components or entities like the E-UTRAN, SGSN, HSS, PCRF, Charging System, GERAN, PDN Gateway, UTRAN etc . . . are not discussed in this document. In FIG. 2A, the mobile packet telecommunications network 200a is set-up where the S-GW 202 is separated from the MME 204. While, the mobile packet telecommunications network 200b shown in FIG. 2B is set-up where the S-GW 202 is separated from the MME 204 but is also co-located with the PDN Gateway.

The mobile packet telecommunications networks 200a and 200b which are associated with 3GPP TS 23.401 v1.0.0 have a newer version of the evolved packet core when compared to the mobile packet telecommunication network 100 which is configured in accordance with 3GPP TR 23.882 v.1.11.1. One such difference relevant to the present discussion is that the term "S-GW" is used instead of the term "UPE" even though the S-GW 202 still has the many of the same functions as the UPE 102. For example, the S-GW 202 stores and manages UE contexts and handles the user plane for packet bearer communications (note: the MME 204 like the aforementioned MME 104 functions to handle the control plane for the packet bearer communications). Basically, the S-GW 202 is a gateway which terminates an interface between the E-UTRAN and each UE associated with the E-UTRAN. In particular, the S-GW 202 being part of an evolved packet core pursuant to the standard 3GPP TS 23.401 v1.0.0 provides the following functions (for example):

1. Local Mobility Anchor point for Intra E-UTRAN handover.

2. Mobility anchor for inter-3GPP mobility such as terminating S4 traffic and relaying traffic between the 2G/3G system (GERAN and UTRAN) and the PDN GW.

3. E-UTRAN idle mode downlink packet buffering and initiating a network triggered service request procedure.

4. Lawful Interception.

5. Packet routing and forwarding.

The term "traffic plane entity" from hereon is used to denote any component which handles the user plane for packet bearer communications such as, for example, the UPE 102 and the S-GW 202 and even the GGSN in a GPRS network which is discussed at the end of this document (note: the term "control entity" is used hereon to denote any component which handles the control plane for packet bearer communications like for example the two MMEs 102 and 202). Thus, the "traffic plane entity" can implement the functionalities of the UPE 102 and/or the functionalities of the S-GW 202. The problem with the current traffic plane entities 102 and 202 relates to their management and storage of UE contexts which are associated with the UEs. Each UE context stores information about one or more bearers that carry data being sent to and received from a specific UE. Each bearer is identified with a TEID or a TEID in combination with a sub-structure identifier. The problem arises when there is more than one bearer per UE context and where each bearer has an allocated TEID or TEID plus sub-structure identifier. In this situation, the current traffic plane entities 102 and 202 when performing a procedure/function need to individually perform this procedure/function for each individual bearer within a specific UE context. This requirement has the following implications (for example):

It is not possible to perform a mobility management operation or procedure which simultaneously affects all of the bearers within a UE context for a given UE.

It is not possible to perform an Operation and Management operation or procedure which simultaneously affects all of the bearers within a UE context for a given UE.

It is not possible to perform a charging operation or procedure which simultaneously affects all of the bearers within a UE context for a given UE.

It is not possible to perform a legal interception operation or procedure which simultaneously affects all of the bearers within a UE context for a given UE.

It is not possible to perform a policy enforcement operation or procedure which simultaneously affects all of the bearers within a UE context for a given UE.

This situation is not desirable because the traffic plane entities 102 and 202 need to individually perform these procedures and operations for each individual bearer within the UE context for a given UE. Accordingly, there has been and is a need to address this shortcoming and other shortcomings which are associated with the existing traffic plane entities that are used in a mobile packet telecommunications network. This particular need and other needs are addressed by the present invention.

SUMMARY

In one aspect, the present invention provides a traffic plane entity (e.g., UPE, S-GW) which implements a method comprising the steps of: (a) receiving a setup request message from a control entity (e.g., MME) where the setup request message includes information about a set of bearers in a context (e.g., UE context) which is associated with a user equipment; (b) processing the setup request message and if successful then allocating a unique identifier that identifies the set of bearers within the context which is associated with the user equipment; and (c) sending an ok message to the control entity where the ok message includes the unique identifier that identifies the set of bearers in the context which is associated with the user equipment. Thereafter, the traffic plane entity can further implement the method which comprises the steps of receiving the unique identifier in subsequent control signaling from the control entity and then using the received unique identifier to perform a procedure which simultaneously affects all of the bearers within the set of bearers in the context which is associated with the user equipment.

In another aspect, the present invention provides a traffic plane entity that has a processor which accesses instructions from a memory and processes those instructions to enable the allocation of a unique identifier that identifies a set of bearers within a context which is associated with a user equipment. The traffic plane entity and in particular the processor further enables the following: (a) sending an ok message to a control entity where the ok message includes the unique identifier that identifies the set of bearers within the context which is associated with the user equipment; and (b) receiving of the unique identifier in subsequent control signaling from the control entity and then using the unique identifier to perform a procedure which simultaneously affects all of the bearers located within the context which is associated with the user equipment.

In yet another aspect, the present invention provides a control entity which has a processor that accesses instructions from a memory and processes those instructions to enable the following: (a) sending a setup request message to a traffic plane entity where the setup request message includes information about a set of bearers within a context which is associated with a user equipment; (b) receiving an ok message from the traffic plane entity where the ok message includes a unique identifier that identifies the set of bearers in the context which is associated with the user equipment; and (c) sending the unique identifier in a control signal to the traffic plane entity which causes the traffic plane entity to perform a procedure which simultaneously affects all of the bearers within the context which is associated with the particular user equipment.

In still yet another aspect, the present invention provides a mobile packet telecommunications network comprising: (a) a control entity; and (b) a traffic plane entity which has a processor that accesses instructions from a memory and processes those instructions to enable the following: (i) receive a setup request message from the control entity where the setup request message includes information about a set of bearers in a context which is associated with a user equipment; (ii) process the setup request message and allocate a unique identifier that identifies the set of bearers in the context which is associated with the user equipment; (iii) send an ok message to the control entity where the ok message includes the unique identifier that identifies the set of bearers in the context which is associated with the user equipment; (iv) receive the unique identifier in subsequent control signaling from the control entity and use the unique identifier to perform a procedure which simultaneously affects all of the bearers within the context which is associated with the user equipment.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
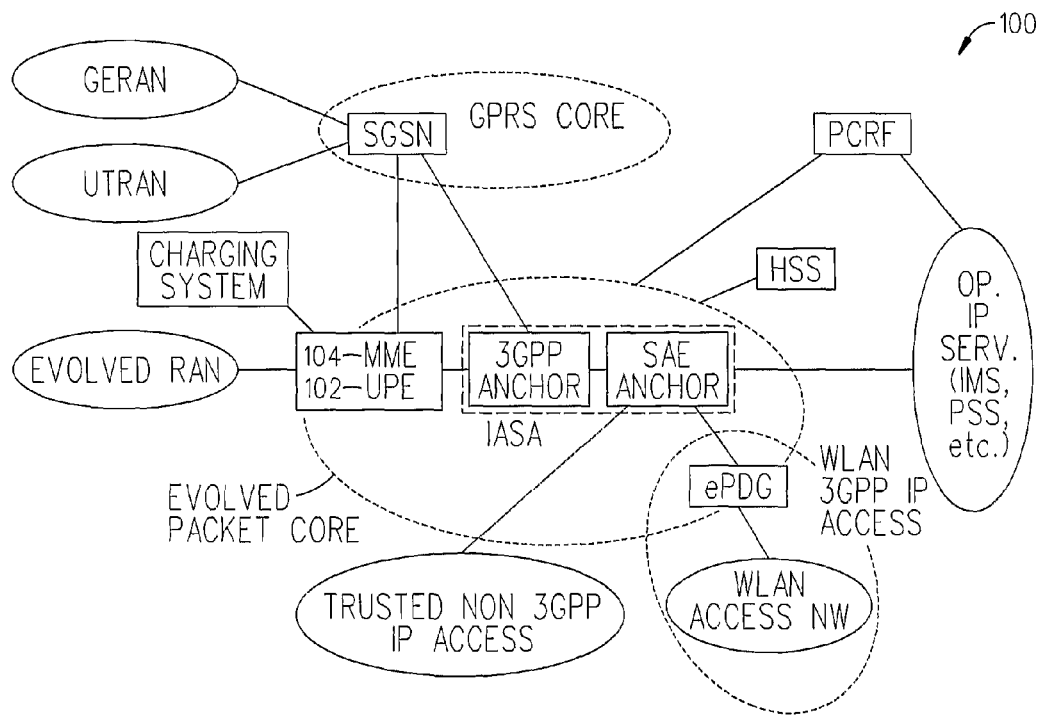
FIG. 1 (PRIOR ART) is a diagram of a mobile packet telecommunications network which has an evolved packet core and an architecture in accordance with the standard 3GPP TR 23.882 v.1.11.1.
Figure 2A:
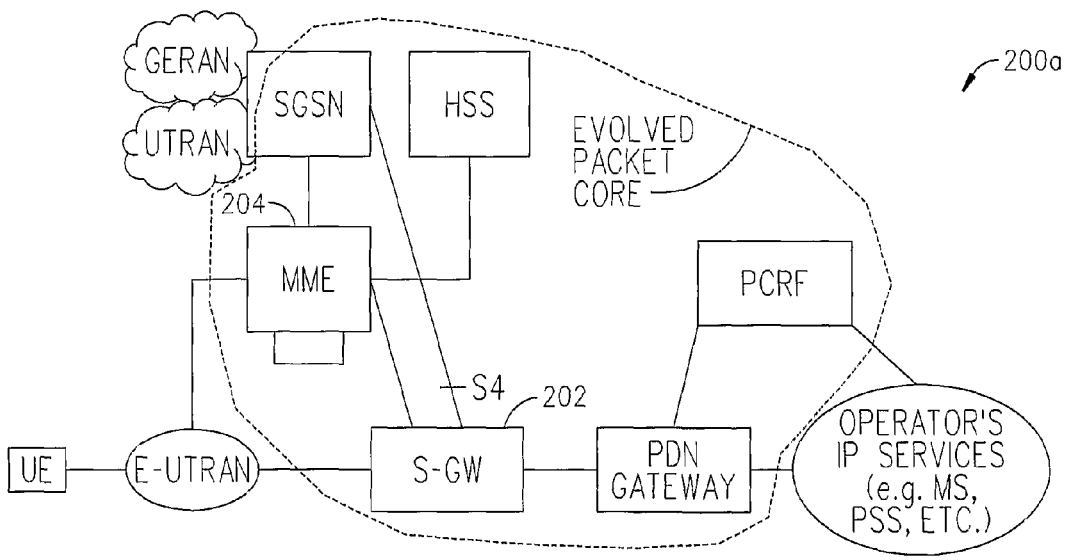
FIGS. 2A and 2B (PRIOR ART) are diagrams of mobile packet telecommunications networks which have evolved packet cores and architectures in accordance with the standard 3GPP TS 23.401 v1.0.0.
Figure 2B:
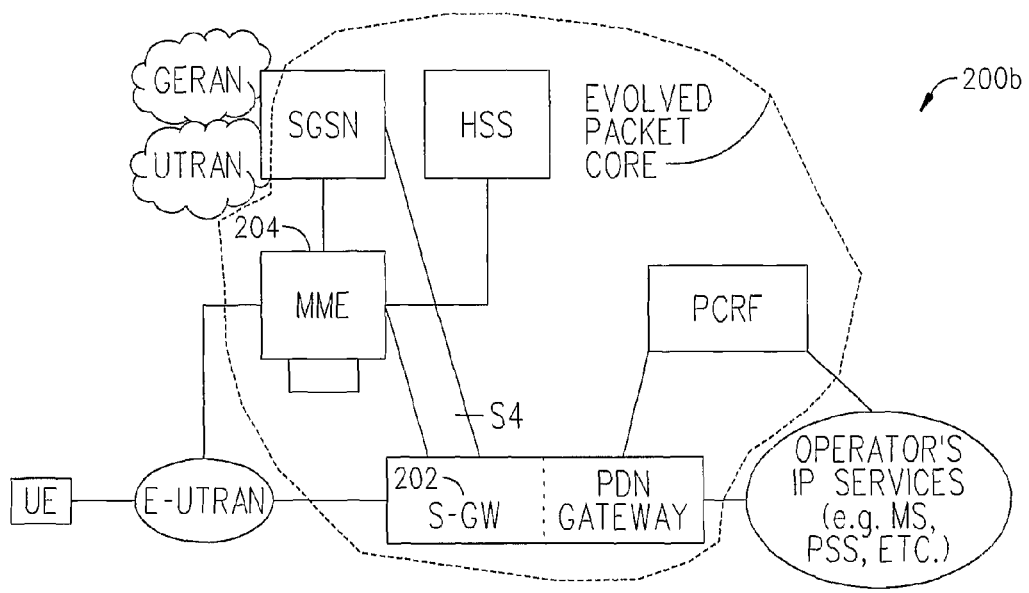
Figure 3:
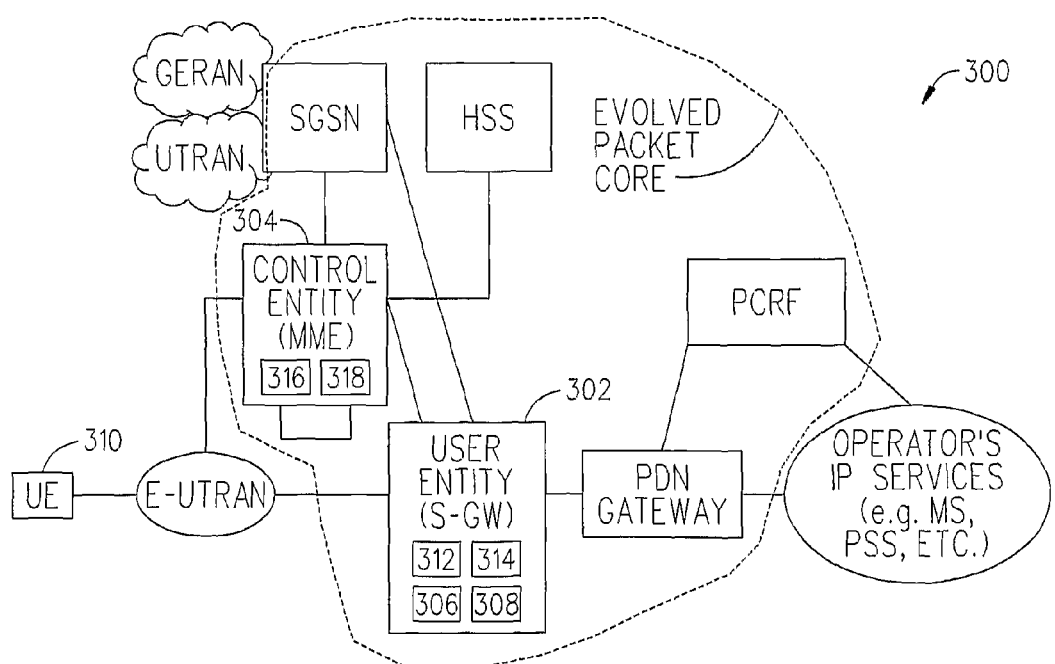
FIG. 3 is a diagram of an exemplary mobile packet telecommunications network which has an evolved packet core with a new traffic plane entity (e.g., UPE, S-GW) and a new control entity (e.g., MME) in accordance with the present invention.

Referring to FIG. 3, there is shown a diagram of an exemplary mobile packet telecommunications network 300 which is used to help explain how a new traffic plane entity 302 (e.g., UPE 302, S-GW 302) and a new control entity (e.g., MME 304) address the aforementioned problem in accordance with the present invention. The exemplary mobile packet telecommunications network 300 excluding the traffic plane entity 302 and the control entity 304 is similar to the mobile packet telecommunications network 200a which was configured in accordance with 3GPP TS 23.401 v1.0.0. However, it should be appreciated that the traffic plane entity 302 and control entity 304 could be implemented within other types of mobile packet telecommunications networks like, for example, the aforementioned mobile packet telecommunications networks 100 and 200b which are configured in accordance with 3GPP TR 23. 882 v.1.11.1 and 3GPP TS 23.401 v1.0.0. Thus, the present invention should not be construed as needing to be used in a specific type or a specific architecture of a mobile packet telecommunications network.

The traffic plane entity 302 addresses the aforementioned problem by allocating a unique identifier 306 which is referred to herein as a unique UE context identifier 306 or a UPE/S-GW UE-Context-Id 306. The unique identifier 306 effectively identifies and unifies all of the bearers which pertain to a specific UE context 308 that is associated with a given UE 310. The traffic plane entity 302 sends the allocated unique identifier 306 to the MME 304 which can then re-send it back to the traffic plane entity 302 along with a request when the MME 304 wants the traffic plane entity 302 to perform a specific operation or procedure on the bearers for the given UE 310 (see FIGS. 4-5). The traffic plane entity 302 then performs the requested operation or procedure simultaneously on the complete set of bearers within the UE context 308 of the given user equipment 310. This is a marked improvement over the traditional traffic plane entities 102 and 202 which had to perform the same operation or procedure on each individual bearer and in particular on their specific TEID or TEID plus sub-structure identifier within the UE context of a given UE. The requested operation or procedure can be anyone of a wide selection of processes including (for example): (1) network mobility; (2) operation and management; (3) charging; (4) policy enforcement; (5) security and/or authentication; or (6) legal interception. A detailed discussion is provided next to explain one way that the traffic plane entity 302 can allocate the unique identifier 306 and how this unique identifier 306 can subsequently be used to perform an operation or procedure simultaneously on the complete set of bearers within a UE context 308 associated with a given UE 310.

Figure 4:
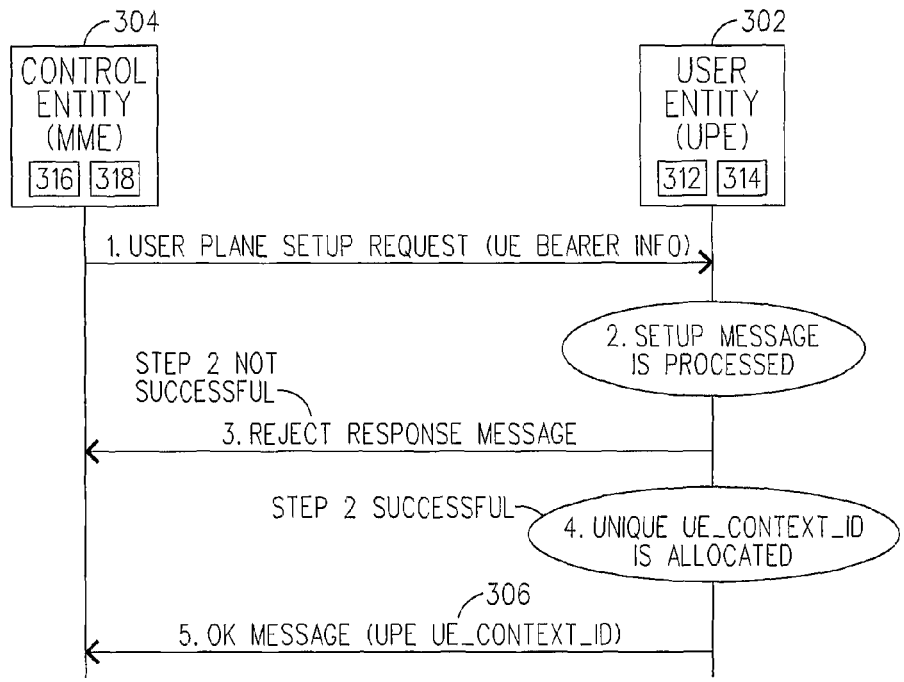
FIG. 4 is a signal flow diagram which is used to help explain one way how the new traffic plane entity by interworking with the new control entity can allocate a unique identifier which identifies and unifies all of the bearers within a UE context that is associated with a given UE in accordance with the present invention.

Referring to FIG. 4, there is a signal flow diagram which is used to help explain one way how the traffic plane entity 302 by inter-working with the MME 304 can allocate the unique identifier 306 which identifies and unifies a set of bearers in a UE context 308 associated with a given UE 310 in accordance with the present invention. The steps are as follows:

1. The control entity 304 sends a User Plane Setup Request message to the traffic plane entity 302. The User Plane Setup Request message includes bearer information, e.g. TEID, IMSI, UE IP address, for a given UE 310.

2. The traffic plane entity 302 processes the received User Plane Setup Request message.

3. The traffic plane entity 302 sends a Reject response message back to the control entity 304 if the processing of the received User Plane Setup Request message was not successful.

4. The traffic plane entity 302 allocates a unique UPE/S-GW UE-Context-Id 306 that will identify and unify a set of bearers in the UE context 308 for the given UE 310 if the processing of the received User Plane Setup Request message was successful.

5. The traffic plane entity 302 responds back to the control entity 304 with an OK message which includes the unique UPE/S-GW UE-Context-Id 306. This assumes the traffic plane entity 302 successfully processed the received User Plane Setup Request message and allocated the unique UPE/S-GW UE-Context-Id 306. It should be appreciated that before the traffic plane entity 302 responds back to the control entity 304 with the OK message and the unique UPE/S-GW UE-Context-Id 306, it is possible that other user plane signaling could have taken place between the traffic plane entity 302 and another network element or even the given UE 310.

Note: The traffic plane entity 302 has a processor 312 that accesses instructions from a memory 314 and processes those instructions to perform the aforementioned steps 1-5. Likewise, the control entity 304 has a processor 316 that accesses instructions from a memory 318 and processes those instructions to perform the aforementioned steps 1, 3 and 5.

Figure 5:
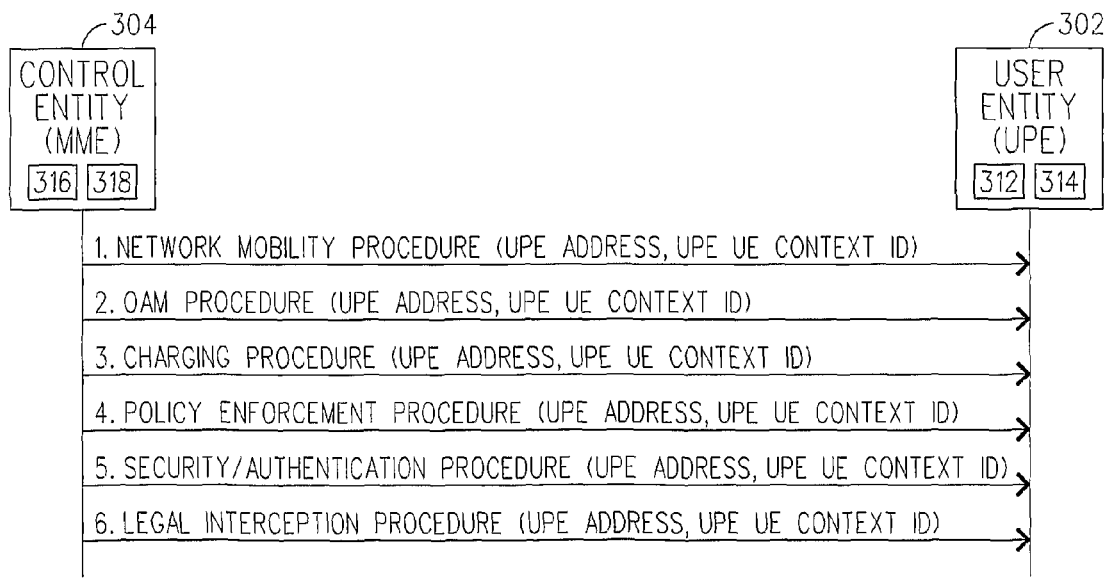
FIG. 5 is a high level diagram illustrating some exemplary procedures and operations that the new control entity could request the new traffic plane entity to perform by using the unique identifier which simultaneously affects all of the bearers within the UE context that is associated with the given UE in accordance with the present invention.

After this point, the control entity 304 should in subsequent control signaling with the traffic plane entity 302 make use of the unique UPE/S-GW UE Context-Id 306 to request various procedures and operations to be performed on the bearers of a given UE 310. FIG. 5 is a high level diagram illustrating some of the exemplary procedures and operations which the control entity 304 could request that the traffic plane entity 302 perform by using the UPE/S-GW UE Context-Id 306 to simultaneously affect all of the bearers within the UE context 308 of a given UE 310. For instance, the traffic plane entity 302 can perform the following procedures or operations:

1. Network mobility procedure in which all of the bearers within the UE context 308 for a given UE 310 are simultaneously re-allocated or even deleted.

2. OAM procedure in which all of the bearers within the UE context 308 for a given UE 310 are simultaneously purged-deleted.

3. Charging procedure in which all of the bearers within the UE context 308 for a given UE 310 are simultaneously used to consolidate and determine charging information.

4. Policy enforcement procedure in which all of the bearers within the UE context 308 for a given UE 310 are simultaneously assigned a new quality of service.

5. Security/Authentication procedure in which all of the bearers with the UE context 308 for a given UE 310 are simultaneously updated with new ciphering keys.

6. Legal Interception procedure in which all of the bearers within the UE context 308 are simultaneously used to perform the legal interception (e.g. logging of data and the transfer to legal authority) of communications to and from a given UE 310.

Note: The control entity 304 could distribute the unique UPE/S-GW UE Context-Id 306 (either upon a request or directly pushed) to other entities in control signaling if those entities wanted to interact with and request the traffic plane entity 302 to perform a procedure or operation on the bearers within the UE context 308 for a given UE 310.

In one embodiment, the unique UPE/S-GW UE Context-Id 306 could have a format that is implementation dependent and if desired could be setup to be interpreted as a bit string by the surrounding nodes (e.g., the control entity 304). In addition, the format of the unique UPE/S-GW UE Context-Id 306 could be such that it enables the traffic plane entity 302 to easily identify the corresponding UE context 308 for a given UE 310. Moreover, the format of the unique UPE/S-GW UE Context-Id 306 could have an additional identifier that enables the traffic plane entity 302 to improve the internal system addressing of a requested procedure or operation. For instance, the traffic plane entity 302 can allocate the unique UPE/S-GW UE Context-Id 306 and include hardware addressing information (e.g. internal board identifier) in the additional identifier that would later help the traffic plane entity 302 to optimize the processing of a control signaling message that is subsequently received from the control entity 304. In particular, the traffic plane entity 302 when allocating the unique UPE/S-GW UE Context-Id 306 could select an additional identifier (e.g., internal board identifier, internal-structure identifier) based on the following mapping:

Identifiers: 0-999->is processed by board 0 in the traffic plane entity 302.

Identifiers: 1000-1999->is processed by board 1 in the traffic plane entity 302.

Identifiers: 2000-2999->is processed by board 2 in the traffic plane entity 302.

As such, when the control entity 304 sends a control signaling message to the traffic plane entity 302 it can then process the additional identifier (e.g., identifier 2009) within the unique UPE/S-GW UE Context-Id 306 and quickly route the received signaling message to the correct board (e.g., board 2) or specific processor for further processing. It should be appreciated that this is just one example of optimization which is possible with using additional identifier(s) in the allocated unique UPE/S-GW UE Context-Id 306.

For example, the unique UPE/S-GW UE Context-Id 306 could have the form of the following function: UPE/S-GW UE Context-Id 306=f (User-Identity, Bearer Information, internal-structure identifier), where the internal-structure identifier is an identifier that is only relevant within a given UPE or S-GW and related to their internal structures (note: this particular internal-structure identifier is just one example of an additional identifier that could be used as input by the exemplary function). The exemplary function (f) could be a concatenation of values associated with the three parameters such as: User-Identity=IMSI; bearer information=TEID_range; internal-structure identifier=board_IP_address. Of course, there are many different formats that could be used to define and configure the unique UPE/S-GW UE Context-Id 306

Figure 6:
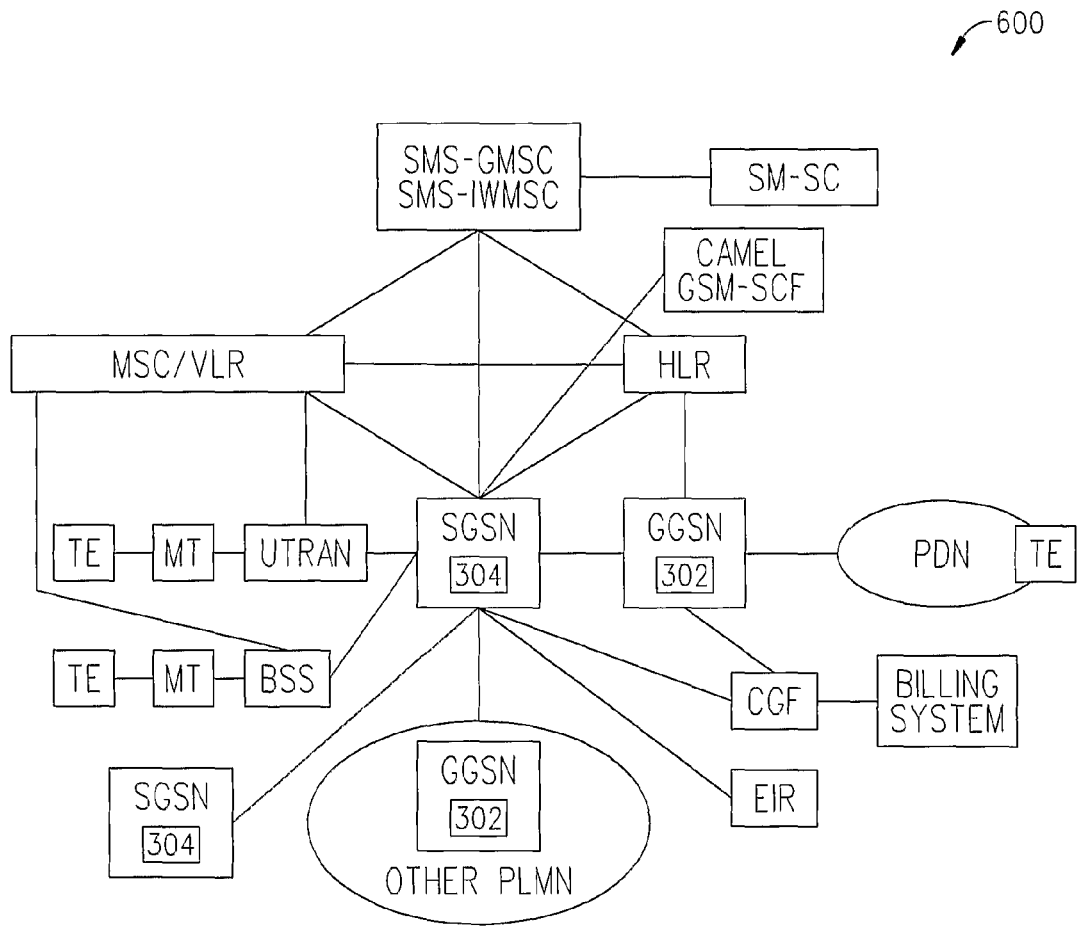
FIG. 6 is a diagram illustrating an exemplary 3GPP 2G/3G mobile packet telecommunications network which has the new traffic plane entity located within a GGSN and the new MME located within a SGSN in accordance with the present invention.

From the foregoing, it should be appreciated that the present solution has been discussed with respect to mobile packet telecommunications networks which have an evolved packet core in accordance with for example the standards 3GPP TR 23.882 v.1.11.1 and 3GPP TS 23.401 v1.0.0. However, it should be appreciated that the present solution could also be implemented within a 3GPP 2G/3G mobile packet telecommunications network. FIG. 6 is a diagram illustrating an exemplary 3GPP 2G/3G mobile packet telecommunications network 600 that is configured in accordance with 3GPP 23.060v.7.5.0 entitled "General Packet Radio Service (GPRS): Service Description Stage 2 (Release 7)" dated September 2007 (the contents of which are incorporated by reference herein). In this example, to implement the present invention the standard would have to be modified to include the functionality of the traffic plane entity 302 within the GGSN(s) and the functionality of the control entity 304 within the SGSN(s) but all of the other components or entities like the UTRAN, HLR, MSC/VLR, CGF, EIR, PDN, BSS, PLMN etc. . . . would function as usual per the standard. In addition, in this example the unique identifier 306 would be associated with a set of bearers within a particular PDP context instead of a particular UE context. The present invention has several advantages three of which are as follows:

1. The traffic plane entity 302 can use the unique identifier 306 to address the UE Context (or PDP context) directly and then simultaneously apply a function or operation to the full set of bearers within the UE context (or PDP context) instead of having to individually apply the function or operation to each individual bearer within the UE context (or PDP context).

2. The present invention simplifies tunnel management operations in the traffic plane entity 302 and in the mobile packet telecommunications network 300 and 600.

3. By letting the traffic plane entity 302 perform the allocation of the unique identifier 306 it also enables the traffic plane entity 302 to specify an additional identifier (e.g. internal board identifier) which makes it possible for the traffic plane entity 302 to later use the unique identifier 306 after it is received as part of a request from the control entity 304 to perform internal routing and optimizations.

Although one embodiment of the present invention has been illustrated in the accompanying Drawings and described in the foregoing Detailed Description, it should be understood that the invention is not limited to the disclosed embodiment, but instead is also capable of numerous rearrangements, modifications and substitutions without departing from the spirit of the invention as set forth and defined by the following claims.

The invention claimed is:

1. A method in a traffic plane entity of a mobile packet telecommunications network, which includes at least a control entity and the traffic plane entity, the method comprising the steps of:
   receiving a setup request message from said control entity where the setup request message includes information about a plurality of bearers in a context which is associated with a user equipment;
   processing the setup request message and if successful then allocating a unique identifier that identifies the plurality of bearers in the context which is associated with the user equipment;
   sending an ok message to said control entity where the ok message includes the unique identifier that identifies the plurality of bearers in the context which is associated with the user equipment;
   receiving at said traffic plane entity the unique identifier in subsequent control signaling from said control entity; and
   using the received unique identifier to perform a procedure at said traffic plane entity which simultaneously affects the plurality of bearers in the context which is associated with the user equipment, wherein said procedure is one of the following:
   a network mobility procedure,
   an operation and management procedure,
   a charging procedure,
   a policy enforcement procedure,
   a security or authentication procedure, or
   a legal interception procedure.

2. The method of claim 1, further comprising a step of sending a rejection message to the control entity if said step of processing the received setup request message was not successful.

3. The method of claim 1, wherein said network mobility procedure is a procedure in which the plurality of bearers in the context are simultaneously re-allocated or deleted.

4. The method of claim 1, wherein said operation and management procedure is a procedure in which the plurality of bearers in the context are simultaneously purged-deleted.

5. The method of claim 1, wherein said charging procedure is a procedure in which the plurality of bearers in the context are simultaneously used to consolidate and determine charging information.

6. The method of claim 1, wherein said policy enforcement procedure is a procedure in which the plurality of bearers in the context are simultaneously assigned a new quality of service.

7. The method of claim 1, wherein said security or authentication procedure is a procedure in which the plurality of bearers in the context for the user equipment are simultaneously updated with new ciphering keys.

8. The method of claim 1, wherein said legal interception procedure is a procedure in which the plurality of bearers in the context are simultaneously used to enable interception of communications to and from the user equipment.

9. The method of claim 1, wherein at least one of the bearers is identified by a tunnel endpoint identifier.

10. The method of claim 1, wherein at least one of the bearers is identified by a tunnel endpoint identifier and a sub-structure identifier.

11. The method of claim 1, wherein said control entity is a mobility management entity and said traffic plane entity is a user plane entity.

12. The method of claim 1, wherein said control entity is a mobility management entity and said traffic plane entity is a serving gateway.

13. The method of claim 1, wherein said control entity is associated with a Serving GPRS Support Node and said traffic plane entity is associated with a Gateway GPRS Support Node.

14. A traffic plane entity of a mobile packet telecommunications network, which includes at least a control entity and the traffic plane entity, said traffic plane entity has a processor that accesses instructions from a memory and processes those instructions to enable the allocation of a unique identifier that identifies a plurality of bearers located in a context which is associated with a user equipment;
   wherein said processor further enables the receiving of a setup request message from said control entity, where the setup request message includes information about a plurality of bearers in a context which is associated with a user equipment;
   wherein said processor further enables the sending of an ok message to said control entity where the ok message includes the unique identifier that identifies the plurality of bearers in the context which is associated with the user equipment; and
   wherein said processor further enables the receiving of the unique identifier in subsequent control signaling from said control entity and then using the received unique identifier to perform a procedure which simultaneously affects the plurality of bearers in the context which is associated with the user equipment, wherein said procedure is one of the following:
   a network mobility procedure,
   an operation and management procedure,
   a charging procedure,
   a policy enforcement procedure,
   a security or authentication procedure, and
   a legal interception procedure.

15. The traffic plane entity of claim 14, wherein at least one of the bearers is identified by a tunnel endpoint identifier.

16. The traffic plane entity of claim 14, wherein at least one of the bearers is identified by a tunnel endpoint identifier and a sub-structure identifier.

17. The traffic plane entity of claim 14, wherein said unique identifier further includes an additional identifier which is used to optimize internal processing functions.

18. The traffic plane entity of claim 14, wherein said unique identifier further includes an internal-structure identifier which is used to internally route messages to specific boards or specific processors.

19. A control entity of a mobile packet telecommunications network, which includes at least the control entity and a traffic plane entity, said control entity has a processor that accesses instructions from a memory and processes those instructions to enable the following:
   send a setup request message to said traffic plane entity, where the setup request message includes information about a plurality of bearers in a context which is associated with a user equipment;
   receive an ok message from said traffic plane entity, where the ok message includes a unique identifier that identifies the plurality of bearers in the context which is associated with the user equipment;
   send the unique identifier in a subsequent control signal to said traffic plane entity which causes said traffic plane entity to perform a procedure which simultaneously affects the plurality of bearers in the context which is associated with the user equipment, wherein said procedure is one of the following:
   a network mobility procedure,
   an operation and management procedure,
   a charging procedure,
   a policy enforcement procedure,
   a security or authentication procedure, or
   a legal interception procedure.

20. The control entity of claim 19, wherein said unique identifier further includes an additional identifier which is used to optimize internal processing functions within the traffic plane entity.

21. A mobile packet telecommunications network comprising:
   a control entity; and
   a traffic plane entity, said traffic plane entity has a processor that accesses instructions from a memory and processes those instructions to enable the following:
   receive a setup request message from said control entity where the setup request message includes information about a plurality of bearers in a context which is associated with a user equipment;
   process the setup request message and allocate a unique identifier that identifies the of bearers in the context which is associated with the user equipment;
   send an ok message to said control entity, where the ok message includes the unique identifier that identifies the plurality of bearers in the context which is associated with the user equipment;
   receive the unique identifier in subsequent control signaling from said control entity; and use the received unique identifier to perform a procedure which simultaneously affects the plurality of bearers in the context which is associated with the user equipment,
   wherein said procedure is one of the following:
   a network mobility procedure,
   an operation and management procedure,
   a charging procedure,
   a policy enforcement procedure,
   a security or authentication procedure, or
   a legal interception procedure.

* * * * *